United States Patent [19]
McMeeking et al.

[11] Patent Number: 6,114,481
[45] Date of Patent: Sep. 5, 2000

[54] CATALYST HAVING A KETIMIDE LIGAND

[75] Inventors: John McMeeking; Xiaoliang Gao; Rupert Edward von Haken Spence; Stephen John Brown; Dusan Jeremic, all of Calgary, Canada

[73] Assignee: Nova Chemicals (International) S.A., Switzerland

[21] Appl. No.: 09/140,608

[22] Filed: Aug. 26, 1998

[30] Foreign Application Priority Data

Sep. 15, 1997 [CA] Canada .................................. 2215444

[51] Int. Cl.⁷ ....................................................... C08F 4/76
[52] U.S. Cl. ......................... 526/161; 526/133; 526/170; 526/172; 526/348.6; 526/901; 526/943; 556/32; 556/53; 502/104
[58] Field of Search ..................................... 526/161, 348, 526/348.6, 348.2, 134, 172, 170, 943, 901, 133; 502/104; 536/53; 556/32

[56] References Cited

U.S. PATENT DOCUMENTS

| | | |
|---|---|---|
| 4,543,399 | 9/1985 | Jenkins, III et al. . |
| 5,055,438 | 10/1991 | Canich ..................................... 502/117 |
| 5,064,802 | 11/1991 | Stevens et al. . |
| 5,153,157 | 10/1992 | Hlatky et al. . |
| 5,324,800 | 6/1994 | Welborn, Jr. et al. . |
| 5,352,749 | 10/1994 | DeChellis et al. . |
| 5,387,568 | 2/1995 | Ewen et al. . |

FOREIGN PATENT DOCUMENTS 0 668 295 A1   8/1995   European Pat. Off. .

OTHER PUBLICATIONS

Jordan et al., Early Metal Carborane Chemistry. Organometallics 1995, 14, 2993–3001, Mar. 1995.

Section 22.3.2.5.1 Amidas and related compounds, p. 392 Anionic II Bonded Derivatives of Titanium (IV), 1993.

*Primary Examiner*—David W. Wu
*Assistant Examiner*—R. Harlan
*Attorney, Agent, or Firm*—Kenneth H. Johnson

[57] ABSTRACT

A catalyst system comprises an organometallic complex of a group 4 metal having a ketimide ligand. The organometallic complex preferably also contains a cyclic ligand which forms a delocalized pi-bond with the metal (such as a cyclopentadienyl-type ligand). Preferred organometallic complexes may be activated with a so-called "substantially non coordinating anion" to form a low cost cocatalyst system which is excellent for the preparation of olefin copolymers having both high molecular weight and very low density.

6 Claims, No Drawings

CATALYST HAVING A KETIMIDE LIGAND

FIELD OF THE INVENTION

This invention relates to a catalyst system for the preparation of olefin copolymers. The catalyst system is especially useful for the preparation of ethylene copolymers which have very high molecular weight and very low density. The catalyst system is characterized by the use of an organometallic complex having a ketimide ligand.

BACKGROUND OF THE INVENTION

Ketimide complexes of group 4 metals have been reported in the literature—see, for example, the review of titanium chemistry which as prepared in part by one of us in 1982 (Ref: M. Bottrill, P. D. Gavens, J. W. Kelland and J. McMeeking in "Comprehensive Organometallic Chemistry", Ed. G. Wilkinson, F. G. A. Stone, & E. W. Abel, Pergamon Press, 1982, Section 22.3, page 392). However, the use of ketimide ligand/group 4 metal complex as an ethylene polymerization catalyst was heretofore unknown.

Preferred ketimide catalysts of this invention also contain one and only one cyclopentadienyl-type ligand.

The prior art includes many examples of olefin polymerization catalysts having a single cyclopentadienyl ligand most notably the so called Bercaw ligand (*Cp—Me$_2$Si—N$^t$Bu) which was disclosed as a Scandium complex by Bercaw et al in the fall of 1988 and subsequently claimed as a titanium complex in U.S. Pat. No. 5,064,802 (Stevens and Neithamer, to Dow Chemical) and U.S. Pat. No. 5,055,438 (Canich, to Exxon). The use of a titanium complex of the Bercaw ligand provides an olefin polymerization catalyst which has excellent comonomer response—i.e. the catalyst is excellent for the preparation of ethylene/α-olefin copolymers. However, the bridged structure of the Bercaw ligand is expensive to synthesize. Accordingly, an olefin polymerization catalyst which doesn't require a "bridge" to provide comonomer response would represent a useful addition to the art.

SUMMARY OF THE INVENTION

The present invention also provides a catalyst system for olefin polymerization comprising:
(a) a catalyst which is an organometallic complex of a group 4 metal; and
(b) an activator,
characterized in that such organometallic complex contains a ketimide ligand.

Preferred forms of the catalyst contain a single ketimide ligand and a single cyclopentadienyl-type ligand.

The invention further provides a process for the copolymerization of ethylene with at least one other olefin monomer using the above described catalyst system.

DETAILED DESCRIPTION

The term "group 4" metal refers to conventional IUPAC nomenclature. The preferred group 4 metals are Ti, Hf and Zr with Ti being most preferred.

As used herein, the term "ketimide ligand" refers to a ligand which:
(a) is bonded to the group 4 metal via a metal-nitrogen atom bond;
(b) has a single substituent on the nitrogen atom, (where this single substituent is a carbon atom which is doubly bonded to the N atom); and.
(c) has two substituents (Sub 1 and Sub 2, described below) which are bonded to the carbon atom.

Conditions a, b, and c are illustrated below:

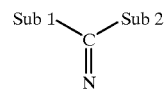

The substituents "Sub 1 and Sub 2" may be the same or different. Exemplary substituents include hydrocarbyls having from 1 to 20 carbon atoms; silyl groups, amido groups and phosphido groups. For reasons of cost and convenience it is preferred that these substituents both be hydrocarbyls, especially simple alkyls and most preferably tertiary butyl.

In the preferred catalyst systems, the catalyst is defined by the formula:

$$L_1L_2MX_2 \quad \text{formula 1}$$

L2:

L2 is a cyclic ligand which forms a delocalized pi-bond with the group 4 metal. L2 is preferably a cyclopentadienyl-type ligand. As used herein, the term cyclopentadienyl-type is meant to convey its conventional meaning and to include indenyl and fluorenyl ligands. The simplest (unsubstituted) cyclopentadiene, indene and fluorene structures are illustrated below.

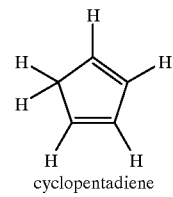
cyclopentadiene

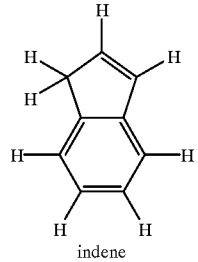
indene

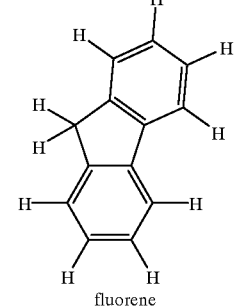
fluorene

Ligands in which one of the carbon atoms in the ring is replaced with a phosphorous atom (i.e. a phosphole) may also be employed.

It will be readily appreciated by those skilled in the art that the hydrogen atoms shown in the above formula may be replaced with substituents to provide the "substituted" analogues. Thus, the preferred catalysts contain a cyclopentadienyl structure which may be an unsubstituted cyclopentadienyl, substituted cyclopentadienyl, unsubstituted indenyl, substituted indenyl, unsubstituted fluorenyl or substituted fluorenyl. A description of permissible substituents on these cyclopentadienyl-type structures is provided in U.S. Pat. No. 5,324,800 (Welborn).

An illustrative list of such substituents for cyclopentadienyl groups included $C_1$–$C_{20}$ hydrocarbyl radicals; substituted $C_1$–$C_{20}$ hydrocarbyl radicals wherein one or more hydrogen atoms is replaced by a halogen radical, an amido radical, a phosphido radical, an alkoxy radical or a radical containing a Lewis acidic or basic functionality; substituted $C_1$–$C_{20}$ hydrocarbyl radicals wherein the substituent contains an atom selected from the group 14 of the Periodic Table of Elements (where group 14 refers to IUPAC nomenclature); and halogen radicals, amido radicals, phosphido radicals, alkoxy radicals, alkyborido radicals, or a radical containing Lewis acidic or basic functionality; or a ring in which two adjacent R-groups are joined forming $C_1$–$C_{20}$ ring to give a saturated or unsaturated polycyclic ligand.

Ligand X: "Non-Interfering Anionic Ligand"

Referring for formula 1, the preferred catalyst systems according to this invention contain two simple anionic ligands denoted by the letter X.

Any simple anionic ligand which may be bonded to an analogous metallocene catalyst component ((i.e. where the analogous metallocene catalyst component is defined by the formula $Cp_2M(X)_2$, where Cp is a cyclopentadienyl-type ligand; M is a group 4 metal; and X is a non-interfering ligand is previously defined herein) may also be used with the catalyst components of this invention.

"Non-interfering" means that this ligand doesn't interfere with (deactivate) the catalyst.

An illustrative list includes hydrogen, hydrocarbyl having up to 10 carbon atoms, halogen, amido and phosphido (with each X preferably being chlorine, for simplicity).

Polymerization Details

The polymerization process of this invention is conducted in the presence of a catalyst and an "activator or cocatalyst". The terms "activator" or "cocatalyst" may be used interchangeably and refer to a catalyst component which combines with the organometallic complex to form a catalyst system that is active for olefin polymerization.

Preferred cocatalysts are the well know alumoxane (also known as aluminoxane) and ionic activators.

The term "alumoxane" refers to a well known article of commerce which is typically represented by the following formula:

where each R' is independently selected from alkyl, cycloalkyl, aryl or alkyl substituted aryl and has from 1–20 carbon atoms and where m is from 0 to about 50 (especially from 10 to 40). The preferred alumoxane is methylalumoxane or "MAO" (where each of the R' is methyl).

Alumoxanes are typically used in substantial molar excess compared to the amount of metal in the catalyst. Aluminum:transition metal molar ratios of from 10:1 to 10,000:1 are preferred, especially from 50:1 to 500:1.

Another type of activator is the "ionic activator" or "substantially non-coordinating anion". As used herein, the term substantially non-coordinating anions ("SNCA") well known cocatalyst or activator systems which are described, for example, in U.S. Pat. No. 5,153,157 (Hlatky and Turner), and the carbonium, sulfonium and oxonium analogues of such activators which are disclosed by Ewen in U.S. Pat. No. 5,387,568. In general, these SNCA form an anion which only weakly coordinates to a cationic form of the catalyst.

While not wanting to be bound by theory, it is generally believed that SNCA-type activators ionize the catalyst by abstraction or protonation of one of the "X" ligands (non-interfering ligands) so as to ionize the group 4 metal center into a cation (but not to covalently bond with the group 4 metal) and to provide sufficient distance between the ionized group 4 metal and the activator to permit a polymerizable olefin to enter the resulting active site. It will appreciated by those skilled in the art that it is preferable that the "non-interfering" ("X") ligands be simple alkyls when using a SNCA as the activator. This may be achieved by the alkylation of a halide form of the catalyst.

Examples of compounds capable of ionizing the group 4 metal complex include the following compounds:

triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra (o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra (o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene(diazonium)tetrakispentafluorophenyl borate,
tropillium phenyltris-pentafluorophenyl borate,
triphenylmethylium phenyl-trispentafluorophenyl borate,
benzene(diazonium)phenyltrispentafluorophenyl borate,
tropillium tetrakis(2,3,5,6-tetrafluorophenyl)borate,
triphenylmethylium tetrakis(2,3,5,6-tetrafluorophenyl) borate,
benzene(diazonium)tetrakis(3,4,5-trifluorophenyl)borate,
tropillium tetrakis(3,4,5-trifluorophenyl)borate,
benzene(diazonium)tetrakis (3,4,5-trifluorophenyl) borate,
tropillium tetrakis(1,2,2-trifluoroethenyl)borate,
triphenylmethylium tetrakis(1,2,2-trifluoroethenyl) borate,
benzene(diazonium)tetrakis(1,2,2-trifluoroethenyl) borate,
tropillium tetrakis(2,3,4,5-tetrafluorophenyl)borate,
triphenylmethylium tetrakis(2,3,4,5-tetrafluorophenyl) borate, and
benzene(diazonium)tetrakis(2,3,4,5-tetrafluorophenyl) borate.

Readily commercially available activators which are capable of ionizing the group 4 metal complexes include:

N,N-dimethylaniliniumtetrakispentafluorophenyl borate ("[Me$_2$NHPh][B(C$_6$F$_5$)$_4$]"); and triphenylmethylium tetrakispentafluorophenyl borate ("[Ph$_3$C][B(C$_6$F$_5$)$_4$]"); and trispentafluorophenyl boron.

These SNCA activators are typically used in approximately equimolar amounts (based on the group 4 metal in the catalyst) but lower levels may also be successful and higher levels also generally work (though sub-optimally with respect to the cost-effective use of the expensive activator).

In addition to the catalyst and cocatalyst, the use of a "poison scavenger" may also be desirable. As many be inferred from the name "poison scavenger", these additives may be used in small amounts to scavenge impurities in the polymerization environment. Aluminum alkyls, for example triisobutyl aluminum, are suitable poison scavengers. (Note: some caution must be exercised when using poison scavengers as they may also react with, and deactivate, the catalyst.)

Polymerizations according to this invention may be undertaken in any of the well know olefin polymerization processes including those known as "gas phase", "slurry", "high pressure" and "solution".

The use of a supported catalyst is preferred for gas phase and slurry processes whereas a non-supported catalyst is preferred for the solution process.

When utilizing a supported catalyst, it may be preferable to initially support the cocatalyst, then the catalyst (as will be illustrated in the Examples).

The polymerization process according to this invention uses ethylene and may include other monomers which are copolymerizable therewith (such as other alpha olefins, preferably butene, hexene or octene, and under certain conditions, dienes such as hexadiene isomers, vinyl aromatic monomers such as styrene or cyclic olefin monomers such as norbornene).

The present invention may also be used to prepare elastomeric co- and terpolymers of ethylene, propylene and optionally one or more diene monomers. Generally, such elastomeric polymers will contain about 50 to abut 75 weight % ethylene, preferably about 50 to 60 weight % ethylene and correspondingly from 50 to 25% of propylene. A portion of the monomers, typically the propylene monomer, may be replaced by a conjugated diolefin. The diolefin may be present in amounts up to 10 weight % of the polymer although typically is present in amounts from about 3 to 5 weight %. The resulting polymer may have a composition comprising from 40 to 75 weight % of ethylene, from 50 to 15 weight % of propylene and up to 10 weight % of a diene monomer to provide 100 weight % of the polymer. Preferred but not limiting examples of the dienes are dicyclopentadiene, 1,4-hexadiene, 5-methylene-2-norbornene, 5-ethylidene-2-norbornene and 5-vinyl-2-norbornene. Particularly preferred dienes are 5-ethylidene-2-norbornene and 1,4-hexadiene.

The polyethylene polymers which may be prepared in accordance with the present invention typically comprise not less than 60, preferably not less than 70 weight % of ethylene and the balance one or more $C_{4-10}$ alpha olefins, preferably selected from the group consisting of 1-butene, 1-hexene and 1-octene. The polyethylene prepared in accordance with the present invention may be linear low density polyethylene having density from about 0.910 to 0.935 g/cc. The present invention might also be useful to prepare polyethylene having a density below 0.910 g/cc—the so called very low and ultra low density polyethylenes.

The most preferred polymerization process of this invention encompasses the use of the novel catalysts (together with a cocatalyst) in a medium pressure solution process. As used herein, the term "medium pressure solution process" refers to a polymerization carried out in a solvent for the polymer at an operating temperature from 100 to 320° C. (especially from 120 to 220° C.) and a total pressure of from 3 to 35 mega Pascals. Hydrogen may be used in this process to control (reduce) molecular weight. Optimal catalyst and cocatalyst concentrations are affected by such variables as temperature and monomer concentration but may be quickly optimized by non-inventive tests.

Further details concerning the medium pressure polymerization process are well known to those skilled in the art and widely described in the open and patent literature.

The catalyst of this invention may also be used in a slurry polymerization process or a gas phase polymerization process.

The typical slurry polymerization process uses total reactor pressures of up to about 50 bars and reactor temperature of up to about 200° C. The process employs a liquid medium (e.g. an aromatic such as toluene or an alkane such as hexane, propane or isobutane) in which the polymerization take place. This results in a suspension of solid polymer particles in the medium. Loop reactors are widely used in slurry processes. Detailed descriptions of slurry polymerization processes are widely reported in the open and patent literature.

In general, a fluidized bed gas phase polymerization reactor employs a "bed" of polymer and catalyst which is fluidized by a flow of monomer which is at least partially gaseous. Heat is generated by the enthalpy of polymerization of the monomer flowing through the bed. Unreacted monomer exits the fluidized bed and is contacted with a cooling system to remove this heat. The cooled monomer is then re-circulated through the polymerization zone together with "make-up" monomer to replace that which was polymerized on the previous pass. As will be appreciated by those skilled in the art, the "fluidized" nature of the polymerization bed helps to evenly distribute/mix the heat of reaction and thereby minimize the formation of localized temperature gradients (or "hot spots"). Nonetheless, it is essential that the heat of reaction be properly removed so as to avoid softening or melting of the polymer (and the resultant-and highly undesirable—"reactor chunks"). The obvious way to maintain good mixing and cooling is to have a very high monomer flow through the bed. However, extremely high monomer flow causes undesirable polymer entrainment.

An alternative (and preferable) approach to high monomer flow is the use of an inert condensable fluid which will boil in the fluidized bed (when exposed to the enthalpy of polymerization), then exit the fluidized bed as a gas, then come into contact with a cooling element which condenses the inert fluid. The condensed, cooled fluid is then returned to the polymerization zone and the boiling/condensing cycle is repeated.

The above-described use of a condensable fluid additive in a gas phase polymerization is often referred to by those skilled in the art as "condensed mode operation" and is described in additional detail in U.S. Pat. No. 4,543,399 and U.S. Pat. No. 5,352,749. As noted in the '399 reference, it is permissible to use alkanes such as butane, pentanes or hexanes as the condensable fluid and the amount of such condensed fluid preferably does not exceed about 20 weight per cent of the gas phase.

Other reaction conditions for the polymerization of ethylene which are reported in the '399 reference are:

Preferred Polymerization Temperatures: about 75° C. to about 115° C. (with the lower temperatures being preferred for lower melting copolymers—especially those having densities of less than 0.915 g/cc—and the higher temperatures being preferred for higher density copolymers and homopolymers); and Pressure: up to abut 1000 psi (with a preferred range of from about 100 to 350 psi for olefin polymerization).

The '399 reference teaches that the fluidized bed process is well adapted for the preparation of polyethylene but further notes that other monomers may also be employed. The present invention is similar with respect to choice of monomers.

Catalysts which are used in gas phase and slurry polymerizations are preferably supported. An exemplary list of support materials include metal oxides (such as silica, alumina, silica-alumina, titania and zirconia); metal chlorides (such as magnesium chloride); talc, polymers (including polyolefins); partially prepolymerized mixtures of a group 4 metal complex, activator and polymer; spray dried mixtures of the group 4 metal complex, activator and fine "inert" particles (as disclosed, for example, in European Patent Office Application 668,295 (to Union Carbide).

The preferred support material is silica. In a particularly preferred embodiment, the silica has been treated with an alumoxane (especially methylalumoxane or "MAO") prior to the deposition of the group 4 metal complex. The procedure for preparing "supported MAO" which is described in U.S. Pat. No. 5,534,474 (to Witco) may provide a low cost catalyst support. It will be recognized by those skilled in the art that silica may be characterized by such parameters as particle size, pore volume and residual silanol concentration. The pore size and silanol concentration may be altered by heat treatment or calcining. The residual silanol groups provide a potential reaction site between the alumoxane and the silica (and, indeed, some off gassing is observed when alumoxane is reacted with silica having residual silanol groups). This reaction may help to "anchor" the alumoxane to the silica (which, in turn, may help to reduce reactor fouling).

The preferred particle size, preferred pore volume and preferred residual silanol concentration may be influenced by reactor conditions. Typical silicas are dry powders having a particle size of from 1 to 200 microns (with an average particle size of from 30 to 100 being especially suitable); pore size from 50 to 500 Angstroms; and pore volumes of from 0.5 to 5.0 cubic centimeters per gram. As a general guideline, the use of commercially available silicas, such as those sold by W.R. Grace under the trademarks Davison 948 or Davison 955, are suitable.

EXAMPLES

The invention will now be illustrated in further detail by way of the following non-limiting examples. For clarity, the Examples have been divided into two parts, namely Part A (Catalyst Component Synthesis), Part B (Solution Polymerization) and Part C (Gas Phase Polymerization).
Polymer Analysis Gel permeation chromatography ("GPC") analysis was carried out using a commercially available chromatograph (sold under the name Waters 150 GPC) using 1,2,4-trichlorobenzene as the mobile phase at 140° C. The samples were prepared by dissolving the polymer in the mobile phase solvent in an external oven at 0.1% (weight/volume) and were run without filtration. Molecular weights are expressed as polyethylene equivalents with a relative standard deviation of 2.9% and 5.0% for the number average molecular weight Mn and weight Mw, respectively. Melt index (MI) measurements were conducted according to ASTM method D-1238-82.

Polymer densities were measured using pressed plaques (AST D-1928-90), with a densitometer. The polymer composition was determined using FTIR where the 1-butene or 1-hexene content was measured.

Part A: Catalyst Component Synthesis
Experimental Section

Catalyst components were prepared using conventional organometallic synthetic techniques, as described below.
Preparation of $^tBu_2C\!\!=\!\!NLi$ (where $^tBu$ is tertiary butyl, and $^tBu_2$ shows that two tertiary butyl groups are bonded to the C (carbon) atom)

This compound was prepared according to a published procedure, D. Armstrong, D. Barr and R. Sanith J. Chem. Soc. Dalton Trans. 1987, 1071. $^1H$ NMR (proton nuclear magnetic resonance ) (toluene-$d_8$, δ): 1.21 (s).
Synthesis of ($^tBu_2C\!\!=\!\!N$)TiCl$_2$Cp (where Cp is a cyclopentadienyl ligand)

A solution of $^tBu_2C\!\!=\!\!NLi$ (1.34 g, 9.11 mmol) in toluene (~20 mL, i.e. approximately 20 mL) was added slowly to CpTiCl$_3$ (2.0 g, 9.11 mmol) in toluene (~30 mL) at −78° C. The yellow solution became orange immediately. The reaction mixture was warmed to 23° C. in 12 hours. The reddish purple solution was filtered through a fine glass filter to remove LiCl and the filtrate was pumped to ~5 mL and hexane (~40 mL) was added. The product crystallized at 70° C. as purple crystals (2.4 g). Evaporation of the mother liquor in a glove box gave X-ray quality crystals (extra 0.3 g). The combined yield was 91%. $^1H$ NMR (toluene-$d_8$, δ): 6.12 (s, 5H), 1.04 (s, 18H).
Synthesis of ($^tBu_2C\!\!=\!\!N$)TiMe$_2$Cp (where Me is methyl)

MeMgBr (3M in ether, 1.1 mL, 3.3 mmol) was added to a toluene solution (40 mL) of ($^tBu_2C\!\!=\!\!N$)TiCl$_2$Cp (0.416 g, 1.283 mmol) at −78° C. After the addition, the solution was warmed to 23° C. in 30 minutes and was then pumped to dryness. The residue was extracted with hexane (2×35 mL) and the slurry was filtered. The filtrate was pumped to dryness to give the pure product as an orange oil. $^1H$ NMR (toluene-$d_8$, δ): 6.0 (s, 5H), 1.15 (s, 18H), 0.636 (s, 6H).
Synthesis of ($^tBu_2C\!\!=\!\!N$)TiCl$_2$Cp* (where Cp* is pentamethylcyclopentadienyl)

Analogous to the synthesis of ($^tBu_2C\!\!=\!\!N$)TiCl$_2$Cp, this compound was synthesized from $^tBu_2C\!\!=\!\!NLi$ and Cp*TlCl$_3$ as orange crystals in almost quantitative yield. $^1H$ NMR (toluene-$d_8$, δ): 1.976 (s, 15H), 1.15 (s, 18H).
Synthesis of ($^tBu_2C\!\!=\!\!N$)TiMe$_2$Cp*

Analogous to the synthesis of ($^tBu_2C\!\!=\!\!N$)TiMe$_2$Cp, this compound was prepared from MeMgBr and ($^tBu_2C\!\!=\!\!N$)TiCl$_2$Cp* as orange crystals in quantitative yield. $^1H$ NMR (toluene-$d_8$, δ): 1.889 (s, 15H), 1.219 (s, 18H), 0.446 (s, 6H).
Synthesis of [(Me$_2$N)$_2$C$\!\!=\!\!$N]TiCl$_2$Cp BuLi (1.6 M in hexane, 6.25 mL, 10 mmol) was added to a toluene solution (~15 mL) of (Me$_2$N)$_2$C$\!\!=\!\!$NH (1.151 g, 10 mmol) at 78° C. The solution was warmed to 23° C. in 10 minutes and was further stirred for 30 minutes to give a toluene solution of (Me$_2$N)$_2$C$\!\!=\!\!$NLi (10 mmol).

The above solution was added to a toluene solution (~50 mL) of CpTiCl$_3$ (2.19 g, 10 mmol) at −78° C. The mixture was warmed to 23° C. in the cold bath. Yellow precipitate was observed. The slurry was pumped to dryness and the residue was extracted with dichloromethane (50 mL). The dichloromethane solution was filtered and was concentrated to ~10 mL. The product crystallized at −20° C. as bright orange crystals after hexane (30 mL) was added. Yield was 2.8 g, 94%. $^1H$ NMR (toluene-$d_8$, δ): 6.28 (s, 5H), 2.26 (s, 12H).
Synthesis of ($^tBu_2C\!\!=\!\!N$)TiCl$_2$(C$_4$Me$_4$P) (where C$_4$Me$_4$P is tetramethylphospholyl)

$^tBu_2C\!\!=\!\!NLi$ (0.384 g, 2.610 mmol) in toluene (~20 mL) was added into a toluene solution (~30 mL) of (C$_4$Me$_4$P)TiCl$_3$ (0.766 g, 2.610 mmol). The reaction was warmed to 23° C. in 5 hours. The solution was filtered and the filtrate was pumped to dryness. The residue was crystallized from hexane at −70° C. (0.920 g, 96%) as orange crystals. $^1H$ NMR (toluene-$d_8$, δ): 2.18 (d, J=9.9 Hz, 6H), 2.03 (s, 6H), 1.17 (s, 18H).

Synthesis of ($^t$Bu$_2$C=N)TiMe$_2$(C$_4$Me$_4$P)

This compound was prepared as orange crystals in quantitative yield from the reaction of ($^t$Bu$_2$C=N)TiCl$_2$(C$_4$Me$_4$P) and excess of MeMgBr (Procedure was similar to that for the preparation of ($^t$Bu$_2$C=N)TiMe$_2$Cp. $^1$H NMR (toluene-d$_8$, δ): 2.02 (d, J=10 Hz, 6H), 1.94 (s, 6H), 0.55 (d, J=0.95 Hz, 6H).

Synthesis of [Ph(Me)C=N]TiMe$_2$Cp (where Ph is phenyl; Me is methyl)

MeLi (1.4 M in ether, 7.14 mL, 10 mmol) was added to PhCN (1.03 g, 10 mmol) in ether (~30 mL) at –100° C. The solution was warmed to 23° C. in 0.5 hr and was stirred for another 0.5 hours. An orange solution of Ph(Me)C=NLi formed.

The above solution was added to a solution of CpTiCl$_3$ in ether (~100 mL) at –78° C. and the reaction mixture was warmed to 23° C. in ~1 hour. The orange solution was pumped to dryness and the residue was extracted with toluene. The toluene solution was filtered and was concentrated to ~2 mL. The product crystallized from a mixture of toluene and hexane at –70° C. Yield 2.93, 97%. $^1$H NMR (toluene-d$_8$, δ): 6.9–7.6 (m, 5H), 6.14 (s, 5H), 1.84 (s, 3H).

Synthesis of ($^t$Bu$_2$C=N)TiCl$_2$(Ind) (where Ind is indenyl)

A solution of $^t$Bu$_2$C=NLi (0.332 g, 2.17 mmol) in 30 mL of toluene was added dropwise to IndTiCl$_3$ (0.584 g, 2.17 mmol) in 30 mL of toluene at –78° C. Once the addition was complete the solution was allowed to reach room temperature while being stirred for 16 hours. The purple solution was then filtered to remove LiCl and toluene was removed under reduced pressure to give a dark purple crystalline solid. Isolated yield is 0.681 g (83%). $^1$H NMR (toluene-d$_8$, δ) (C$_7$D$_8$): 7.25 (m, 2H), 6.88 (m, 2H), 6.44 (m, 3H), 1.01 (s, 18H).

Part B: Solution Polymerization

The Continuous Solution Polymerization

All the polymerization experiments described below were conducted on a continuous solution polymerization reactor. The process is continuous in all feed streams (solvent, monomers and catalyst) and in the removal of product. All feed streams were purified prior to the reactor by contact with various absorption media to remove catalyst killing impurities such as water, oxygen and polar materials as is known to those skilled in the art. All components were stored and manipulated under an atmosphere of purified nitrogen.

All the examples below were conducted in a reactor of 71.5 cc internal volume. In each experiment the volumetric feed to the reactor was kept constant and as a consequence so was the reactor residence time.

The catalyst solutions were pumped to the reactor independently and there was no pre-contact between the activator and the catalyst. Because of the low solubility of the catalysts, activators and MAO in cyclohexane, solutions were prepared in purified xylene. The catalyst was activated in-situ (in the polymerization reactor) at the reaction temperature in the presence of the monomers. The polymerizations were carried out in cyclohexane at a pressure of 1500 psi. Ethylene was supplied to the reactor by a calibrated thermal mass flow meter and was dissolved in the reaction solvent prior to the polymerization reactor. If comonomer (for example 1-octene) was used it was also premixed with the ethylene before entering the polymerization reactor. Under these conditions the ethylene conversion is a dependent variable controlled by the catalyst concentration, reaction temperature and catalyst activity, etc.

The internal reactor temperature is monitored by a thermocouple in the polymerization medium and can be controlled at the required set point to +/–0.5° C. Downstream of the reactor the pressure was reduced from the reaction pressure (1500 psi) to atmospheric. The solid polymer was then recovered as a slurry in the condensed solvent and was dried by evaporation before analysis.

The ethylene conversion was determined by a dedicated on line gas chromatograph by reference to propane which was used as an internal standard. The average polymerization rate constant was calculated based on the reactor hold-up time, the catalyst concentration in the reactor and the ethylene conversion and is expressed in l/(mmol*min).

Average polymerization rate (kp)=(Q/(100-Q))×(1/[M])×(1/HUT):

where:

Q is the percent ethylene conversion;

[M] is the catalyst (metal) concentration in the reactor expressed in mM; and

HUT is the reactor hold-up time in minutes.

Example 1

($^t$Bu$_2$C=N)TiCl$_2$Cp was added to the reactor at 37×10$^{-6}$ mol/l along with MAO (PMAO-IP, Akzo-Nobel) at Al/Ti=200. [Note: all Al/Ti ratios referred to in the Examples are mol/mol basis)]. The reaction temperature was 160° C. and 2.1 gram/min. of ethylene was continuously added to the reactor. An ethylene conversion of 37.5% was observed (see Table 1).

Example 2

($^t$Bu$_2$C=N)TiCl$_2$Cp was added to the reactor at 37×10$^{-6}$ mol/l along with MAO (PMAO-IP, Akzo-Nobel) at Al/Ti=200 (mol/mol). The reaction temperature was 160° C., 2.1 gram/min. of ethylene and 4.0 ml/min. of 1-octene was continuously added to the reactor. An ethylene conversion of 28.5% was observed (see Table 1).

Example 3

($^t$Bu$_2$C=N)TiMe$_2$Cp was added to the reactor at 37×10$^{-6}$ mol/l along with Ph$_3$C B(C$_6$F$_5$)$_4$ (Asahi Glass) at B/Ti=1.0 (mol/mol). The reaction temperature was 160° C. and 2.1 gram/min. of ethylene was continuously added to the reactor. An ethylene conversion of 58.7% was observed (see Table 1).

Example 4

($^t$Bu$_2$C=N)TiMe$_2$Cp was added to the reactor at 18.5×10$^{-6}$ mol/l along with Ph$_3$C B(C$_6$F$_5$)$_4$ (Asahi Glass) at B/Ti=1.0 (mol/mol). The reaction temperature was 160° C. and 2.1 gram/min. of ethylene was continuously added to the reactor. An ethylene conversion of 51.6% was observed (see Table 1).

Example 5

($^t$Bu$_2$C=N)TiMe$_2$Cp was added to the reactor at 37×10$^{-6}$ mol/l along with Ph$_3$C B(C$_6$F$_5$)$_4$ (Asahi Glass) at B/Ti=1.0 (mol/mol). The reaction temperature was 160° C. and 2.1 gram/min. of ethylene along with 4.0 ml/min. of purified 1-octene was continuously added to the reactor. An ethylene conversion of 45.5% was observed (see Table 1).

Example 6

($^t$Bu$_2$C=N)TiCl$_2$Cp* was added to the reactor at 37×10$^{-6}$ mol/l along with MAO (PMAO-IP, Akzo-Nobel) at Al/Ti=200 (mol/mol). The reaction temperature was 160° C. and 2.1 gram/min. of ethylene was continuously added to the reactor. An ethylene conversion of 78.7% was observed (see Table 1).

Example 7

($^t$Bu$_2$C=N)TiCl$_2$Cp* was added to the reactor at 37×10$^{-6}$ mol/l along with MAO (PMAO-IP, Akzo-Nobel) at Al/Ti=

200 (mol/mol). The reaction temperature was 160° C., 2.1 gram/min. of ethylene and 4.0 ml/min. of 1-octene was continuously added to the reactor. An ethylene conversion of 60.3% was observed (see Table 1).

Example 8

($^t$Bu$_2$C=N)TiCl$_2$Cp* was added to the reactor at 37×10$^{-6}$ mol/l along with MAO (PMAO-IP, Akzo-Nobel) at Al/Ti=200 (mol/mol). The reaction temperature was 160° C., 2.1 gram/min. of ethylene along with 2.0 ml/min. of purified 1-octene was continuously added to the reactor. An ethylene conversion of 66.9% was observed (see Table 1).

Example 9

($^t$Bu$_2$C=N)TiMe$_2$Cp* was added to the reactor at 37×10$^{-6}$ mol/l along with Ph$_3$C B(C$_6$F$_5$)$_4$ (Asahi Glass) at B/Ti=1.0 (mol/mol). The reaction temperature was 160° C., 2.1 gram/min. of ethylene was continuously added to the reactor. An ethylene conversion of 81.4% was observed (see Table 1).

Example 10

($^t$Bu$_2$C=N)TiMe$_2$Cp* was added to the reactor at 37×10$^{-6}$ mol/l along with Ph$_3$C B(C$_6$F$_5$)$_4$ (Asahi Glass) at B/Ti=1.0 (mol/mol). The reaction temperature was 160° C., 2.1 gram/min. of ethylene and 4.0 ml/min. of 1-octene was continuously added to the reactor. An ethylene conversion of 60.8% was observed (see Table 1).

Example 11

($^t$Bu$_2$C=N)TiMe$_2$Cp* was added to the reactor at 37×10$^{-6}$ mol/l along with Ph$_3$C B(C$_6$F$_5$)$_4$ (Asahi Glass) at B/Ti=1.0 (mol/mol). The reaction temperature was 140° C., 1.0 gram/min. of ethylene was continuously added to the reactor. An ethylene conversion of 94.3% was observed (see Table 1).

Example 12

($^t$Bu$_2$C=N)TiCl$_2$(C$_4$Me$_4$P) was added to the reactor at 37×10$^{-6}$ mol/l along with Ph$_3$C B(C$_6$F$_5$)$_4$ (Asahi Glass) at B/Ti=1.0 (mol/mol). The reaction temperature was 160° C., 2.1 gram/min. of ethylene was continuously added to the reactor. An ethylene conversion of 34.5% was observed (see Table 1).

Example 13

($^t$Bu$_2$C=N)TiCl$_2$(C$_4$Me$_4$P) was added to the reactor at 148×10$^{-6}$ mol/l along with Ph$_3$C B(C$_6$F$_5$)$_4$ (Asahi Glass) at B/Ti=1.0 (mol/mol). The reaction temperature was 160° C., 2.1 gram/min. of ethylene and 3.0 ml/min. of 1-octene was continuously added to the reactor. An ethylene conversion of 46.1% was observed (see Table 1).

Comparative Example 14

(C$_5$Me$_5$)$_2$ZrCl$_2$ (purchased from Strem, where C$_5$Me$_5$ is pentamethylcyclopentadienyl) was added to the reactor at 37×10$^{-6}$ mol/l along with MMAO-3 (Akzo-Nobel, Al/Ti=400 mol/mol). The reaction temperature was 140° C. and 1.0 gram/min. of ethylene was continuously added to the reactor. An ethylene conversion of 55.5% was observed (see Table 1).

Comparative Example 15

(C$_5$Me$_5$)$_2$ZrCl$_2$ (Strem) was added to the reactor at 37×10$^{-6}$ mol/l along with MMAO-3 (Akzo-Nobel, Al/Ti=400 mol/mol). The reaction temperature was 160° C. and 1.0 gram/min. of ethylene was continuously added to the reactor. An ethylene conversion of 35.6% was observed (see Table 1).

Comparative Example 16

(C$_5$Me$_5$)$_2$ZrCl$_2$ (Strem) was added to the reactor at 37×10$^{-6}$ mol/l along with MMAO-3 (Akzo-Nobel, Al/Ti=400 mol/mol). The reaction temperature was 160° C. and 2.1 gram/min. of ethylene was continuously added to the reactor. An ethylene conversion of 37.4% was observed (see Table 1).

Comparative Example 17 rac-Et(Ind)$_2$ZrCl$_2$ ((i.e. raceimic form of ethylene bridged bis Indenyl ZrCl$_2$, purchase from Witco) was added to the reactor at 37×10$^{-6}$ mol/l along with MMAO-3 (Akzo-Nobel, Al/Ti=400 mol/mol). The reaction temperature was 160° C. and 2.1 gram/min. of ethylene was continuously added to the reactor. An ethylene conversion of 94.6% was observed (see Table 1).

Comparative Example 18 rac-Et(Ind)$_2$ZrCl$_2$ (Witco) was added to the reactor at 37×10$^{-6}$ mol/l along with MMAO-3 (Akzo-Nobel, Al/Ti=400 mol/mol). The reaction temperature was 160° C. and 2.1 gram/min. of ethylene and 3.25 ml/min. of 1-octene was continuously added to the reactor. An ethylene conversion of 94.8% was observed (see Table 1).

Example 19

Slurry Polymerization

Slurry polymerizations were carried out in a temperature controlled reactor at 35° C. at an ethylene pressure of 10 psig. 300 ml of purified cyclohexane was first transferred to the reactor followed by MAO (PMAO-IP, Akzo-Nobel, 1.8 ml of 12.9 wt % Al) and was then stirred for 5 minutes. The catalyst ($^t$Bu$_2$C=N)TiCl$_2$Cp (15.2×10 moles, to give a reactor concentration of 50×10$^{-6}$ M, Al/Ti=500) was then added and the reactor pressurized to 10 psig with ethylene. Polymerization was allowed to continue to 30 minutes at which time the pressure was vented (to prevent further reaction) and the polymer was recovered by evaporation of the solvent. Reactor temperature and ethylene consumption were monitored during the reaction. The polymer yield was 5.08 g giving an activity of 0.17 kg PE/(mmol Ti×hr).

Example 20

Slurry Polymerization

Reaction conditions were similar to those of example 19. MAO (PMAO-IP, Akzo-Nobel, 1.8 ml of 12.9 wt % Al) and ($^t$Bu$_2$C=N)TiCl$_2$Cp* (15.2×10$^{-6}$ moles, to give a reactor concentration of 50×10$^{-6}$ M, Al/Ti=500) were added and the reactor pressurized to 10 psig with ethylene. The polymer yield was 6.26 g giving an activity of 0.21 kg PE/(mmol Ti×hr).

Example 21

Slurry Polymerization

Reaction conditions were similar to those of example 19. MAO (PMAO-IP, Akzo-Nobel, 1.8 ml of 12.9 wt % Al) and [(Me$_2$N)$_2$C=N]TiCl$_2$Cp (15.2×10$^{-6}$ moles, to give a reactor concentration of 50×10$^{-6}$ M, Al/Ti=500) were added and the reactor pressurized to 10 psig with ethylene. The polymer yield was 0.81 g giving an activity of 0.03 kg PE/(mmol Ti×hr).

Example 22

Slurry Polymerization

Reaction conditions were similar to those of example 19. MAO (PMAO-IP, Akzo-Nobel, 1.8 ml of 12.9 wt % Al) and ($^t$Bu$_2$C=N)TiCl$_2$Ind (15.2×10$^{-6}$ moles, to give a reactor concentration of 50×10$^{-6}$ M, Al/Ti=500) were added and the reactor pressurized to 10 psig with ethylene. The polymer yield was 13.02 g giving an activity of 0.43 kg PE/(mmol Ti×hr).

Example 23
Slurry Polymerization

Reaction conditions were similar to those of example 19. MAO (PMAO-IP, Akzo-Nobel, 1.8 ml of 12.9 wt % Al) and ($^t$Bu$_2$C=N)TiCl$_2$(C$_4$Me$_4$P) (15.2×10$^{-6}$ moles, to give a reactor concentration of 50×10$^{-6}$ M, Al/Ti=500) were added and the reactor pressurized to 10 psig with ethylene. The polymer yield was 2.63 g giving an activity of 0.09 kg PE/(mmol Ti×hr).

Comparative Example 24
Slurry Polymerization

Reaction conditions were similar to those of example 19. MAO (PMAO-IP, Akzo-Nobel, 1.8 ml of 12.9 wt % Al) and [Ph(Me)C=N]TiMe$_2$Cp (15.2×10$^{-6}$ moles, to give a reactor concentration of 50×10$^{-6}$ M, Al/Ti=500) were added and the reactor pressurized to 10 psig with ethylene. The polymer yield was 0.84 g giving an activity of 0.03 kg PE/(mmol Ti×hr).

Comparative Example 25
Slurry Polymerization

Reaction conditions were similar to those of example 19. MAO (PMAO-IP, Akzo-Nobel, 1.8 ml of 12.9 wt % Al) and Ph$_2$C(Flu)(Cp)ZrCl$_2$ (15.2×10$^{-6}$ moles, to give a reactor concentration of 50×10$^{-6}$ M, Al/Ti=500) were added and the reactor pressurized to 10 psig with ethylene. The polymer yield was 5.64 g giving an activity of 0.02 kg PE/(mmol Zr×hr).

Comparative Example 26
Slurry Polymerization

Reaction conditions were similar to those of example 19. MAO (PMAO-IP, Akzo-Nobel, 1.8 ml of 12.9 wt % Al) and (Cp)$_2$ZrCl$_2$ (15.2×10$^{-6}$ moles, to give a reactor concentration of 50×10$^{-6}$ M, Al/Ti=500) were added and the reactor pressurized to 10 psig with ethylene. The polymer yield was 20.18 g giving an activity of 0.69 kg PE/(mmol Zr×hr).

air-sensitive materials. Standard Schlenk and drybox techniques were used in the preparation of ligands, metal complexes, support substrates and supported catalyst systems. Solvents were purchased as anhydrous materials and further treated to remove oxygen and polar impurities by contact with a combination of activated alumina, molecular sieves and copper oxide on silica/alumina. Where appropriate, elemental compositions of the supported catalysts were measured by Neutron Activation analysis and a reported accuracy of ±1% (weight basis).

The supported catalysts were prepared by initially supporting MAO on a silica support, followed by deposition of the catalyst component.

All the polymerization experiments described below were conducted using a semi-batch, gas phase polymerization reactor of total internal volume of 2.2 L. Reaction gas mixtures, including separately ethylene or ethylene/butene mixtures were measured to the reactor on a continuous basis using a calibrated thermal mass flow meter, following passage through purification media as described above. A pre-determined mass of the catalyst sample as added to the reactor under the flow of the inlet gas with no pre-contact of the catalyst with any reagent, such as a catalyst activator The catalyst was activated in-situ (in the polymerization reactor) at the reaction temperature in the presence of the monomers, using a metal alkyl complex which has been previously added to the reactor to remove adventitious impurities. Purified and rigorously anhydrous sodium chloride was used as a catalyst dispersing agent.

The internal reactor temperature is monitored by a thermocouple in the polymerization medium and can be controlled at the required set point to +/−1.0° C. The duration of the polymerization experiment was one hour. Following the

TABLE 1

| Example | Total Flow To Reactor (ml/min.) | Catalyst Concentration (mol × 10$^6$) | Ethylene Conversion (%) | Calculated Polymerization Rate (kp) (l/mmol × min.) | Polymer Density (g/cc) | Polymer Melt Index | Mn × 10$^{-3}$ | Mw × 10$^{-3}$ |
|---|---|---|---|---|---|---|---|---|
| 1 | 27.0 | 37.0 | 37.5 | 6.2 | 0.958 | 0.08 | 52 | 174 |
| 2 | 27.0 | 37.0 | 28.5 | 4.1 | 0.920 | 0.452 | 43 | 128 |
| 3 | 27.0 | 37.0 | 58.7 | 14.5 | — | — | — | — |
| 4 | 27.0 | 18.0 | 51.6 | 21.8 | 0.9371 | <0.001 | 227 | 448 |
| 5 | 27.0 | 37.0 | 45.4 | 8.5 | 0.8965 | 0.003 | — | — |
| 6 | 27.0 | 37.0 | 78.7 | 37.7 | 0.951 | 0.04 | 113 | 218 |
| 7 | 27.0 | 37.0 | 60.3 | 15.5 | 0.906 | 0.078 | 77 | 184 |
| 8 | 27.0 | 37.0 | 66.9 | 20.6 | 0.913 | 0.042 | — | — |
| 9 | 27.0 | 37.0 | 81.4 | 44.7 | — | — | — | — |
| 10 | 27.0 | 37.0 | 60.8 | 15.8 | 0.8868 | 0.100 | — | — |
| 11 | 27.0 | 37.0 | 94.3 | 169.6 | 0.942 | 0.023 | — | — |
| 12 | 27.0 | 37.0 | 34.5 | 5.4 | — | — | — | — |
| 13 | 27.0 | 148.1 | 46.1 | 2.2 | 0.906 | 0.007 | 63 | 288 |
| 14 | 27.0 | 37.0 | 55.5 | 12.7 | — | 880 | 2.7 | 10.0 |
| 15 | 27.0 | 37.0 | 35.6 | 5.6 | — | — | 1.8 | 7.5 |
| 16 | 27.0 | 37.0 | 37.4 | 6.1 | — | 620 | 3.3 | 12.0 |
| 17 | 27.0 | 37.0 | 94.6 | 178.6 | — | 1300 | 3.9 | 14.0 |
| 18 | 27.0 | 37.0 | 94.8 | 186.0 | 0.925 | very high | 2.6 | 10.0 |

Part C: Gas Phase Polymerization
Catalyst Preparation and Polymerization Testing Using a Semi-Batch, Gas Phase Reactor The catalyst preparation methods described below employ typical techniques for the syntheses and handling of completion of the polymerization experiment, the polymer was separated from the sodium chloride and the yield determined.

Table 2 illustrates data concerning the Al/transition metal ratios of the supported catalyst; polymer yield and polymer properties.

TABLE 2

| Complex | mmol Complex | Support[1] (g) | mg of Catalyst | Homo[2] or Co[2] | Yield (g) | g Pe[3]/g Metal | g Pe[3]/g Catalyst | Al/Ti Ratio |
|---|---|---|---|---|---|---|---|---|
| ($^t$Bu$_2$C=N)TiCl$_2$Cp | 52 mg (160 mmol) | 1.485 | 48 | Homo | 2.6 | 5710 | 54 | 86.00 |
|  |  |  | 51 | Co | 1.7 | 3514 | 33 |  |
| ($^t$Bu$_2$C=N)TiCl$_2$Cp* | 45 mg (114 mmol) | 1.031 | 18 | Homo | 13.8 | 76405 | 767 | 68.24 |
|  |  |  | 25 | Co | 22.4 |  | 868 |  |
| ($^t$Bu$_2$C=N)TiCl$_2$Ind | 44 mg (118 mmol) | 1.012 | 26 | Homo | 10.9 | 41404 | 419 | 79.47 |
|  |  |  | 31 | Co | 11.4 | 36319 | 368 |  |
| ($^t$Bu$_2$C=N)TiCl$_2$(C$_4$Me$_4$P) | 44 mg (110 mmol) | 0.999 | 33 | Homo | 1 | 3134 | 30 | 84.15 |
|  |  |  | 29 | Co | 0.6 | 2140 | 21 |  |

[1]Support is Witco/MAO SiO$_2$ TA 02794/HL/04
[2]Ethylene hompolymerization (Homo) or Ethylene-Butene copolymerization (Co)
[3]Pe = Polyethylene

What is claimed is:

1. A process for the copolymerization of ethylene and at least one additional alpha olefin having from 3 to 8 carbon atoms characterized in that said process employs a catalyst system for olefin polymerization comprising:
   a) a catalyst which is an organometallic complex of a group 4 metal; and
   b) an activator, characterized in that such organometallic complex contains a ketimide ligand.

2. The process according to claim 1 when conducted in a gas phase, or slurry reactor, further characterized in that said catalyst system is in supported form.

3. The process according to claim 2 wherein said organometallic complex is defined by the formula:

($^t$Bu$_2$C=N)TiCl$_2$Cp.

4. The process according to claim 1 when conducted in a medium pressure solution polymerization process.

5. The process according to claim 4 wherein said organometallic complex is defined by the formula:

($^t$Bu$_2$C=N)TiCl$_2$Cp.

6. The process according to claim 5 wherein said activator comprises a substantially non coordinating anion defined by the formula:

B(C$_6$F$_5$)$_4$ $^-$.

* * * * *